(12) United States Patent
Sato et al.

(10) Patent No.: US 6,356,710 B1
(45) Date of Patent: Mar. 12, 2002

(54) DC MOTOR CONTROL SYSTEM AND METHOD

(75) Inventors: Shigemi Sato, Asahi-Mura; Nobutoshi Otsuka; Zenta Kosaka, both of Matsumoto, all of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/469,710

(22) Filed: Dec. 21, 1999

(30) Foreign Application Priority Data

Dec. 25, 1998 (JP) .......................................... 10-369747

(51) Int. Cl.[7] ................................................ H02P 5/42
(52) U.S. Cl. ........................ 388/804; 388/811; 318/439
(58) Field of Search ................................. 388/804, 811; 318/439, 366, 364, 369

(56) References Cited

U.S. PATENT DOCUMENTS

| | | | | |
|---|---|---|---|---|
| 4,457,639 A | * | 7/1984 | Nagai | 400/322 |
| 5,029,264 A | * | 7/1991 | Ito et al. | 318/685 |
| 5,115,735 A | * | 5/1992 | Gloe et al. | 100/43 |
| 5,119,136 A | * | 6/1992 | Morikawa | 355/235 |
| 5,207,520 A | * | 5/1993 | Tanaka | 400/279 |
| 5,433,541 A | * | 7/1995 | Hieda et al. | 400/279 |
| 5,748,206 A | * | 5/1998 | Yamane | 347/37 |
| 5,898,288 A | * | 4/1999 | Rice et al. | 318/685 |
| 5,957,596 A | * | 9/1999 | Hastings et al. | 400/615.2 |
| 5,963,706 A | * | 10/1999 | Baik | 388/804 |
| 5,998,956 A | * | 12/1999 | Saito | 318/696 |

FOREIGN PATENT DOCUMENTS

| | | |
|---|---|---|
| JP | 58-56862 | 4/1983 |
| JP | 58-56863 | 4/1983 |

* cited by examiner

*Primary Examiner*—Jeffrey Donels
*Assistant Examiner*—Rina I. Duda
(74) *Attorney, Agent, or Firm*—Hogan & Hartson, L.L.P.

(57) ABSTRACT

There is provided a DC motor control system and method which is capable of carrying out an accurate rotation control of a DC motor even when the power supply voltage thereof is reduced. A detection signal indicative of a detected number of rotations of the DC motor is delivered. Stop control is carried out for stopping the DC motor by braking rotation of the DC motor when the number of rotations of the DC motor indicated by the detection signal has reached a predetermined number of rotations.

14 Claims, 14 Drawing Sheets

FIG. 11

| IN1A | IN2A | OUT1A | OUT2A | MODE |
|---|---|---|---|---|
| 0 | 1 | L | H | REVERSE ROTATION |
| 1 | 0 | H | L | NOMAL ROTATION |
| 0 | 0 | HIGH IMPEDANCE | | STOP |

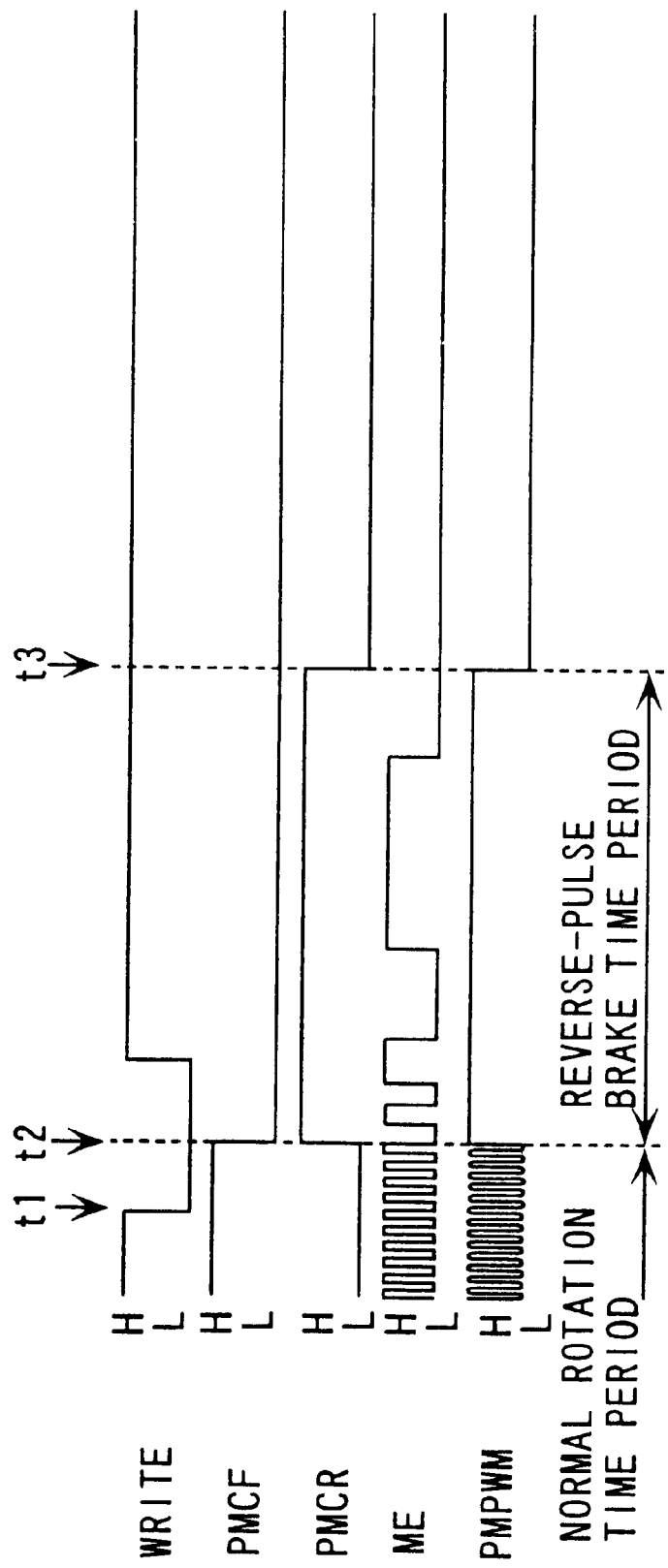

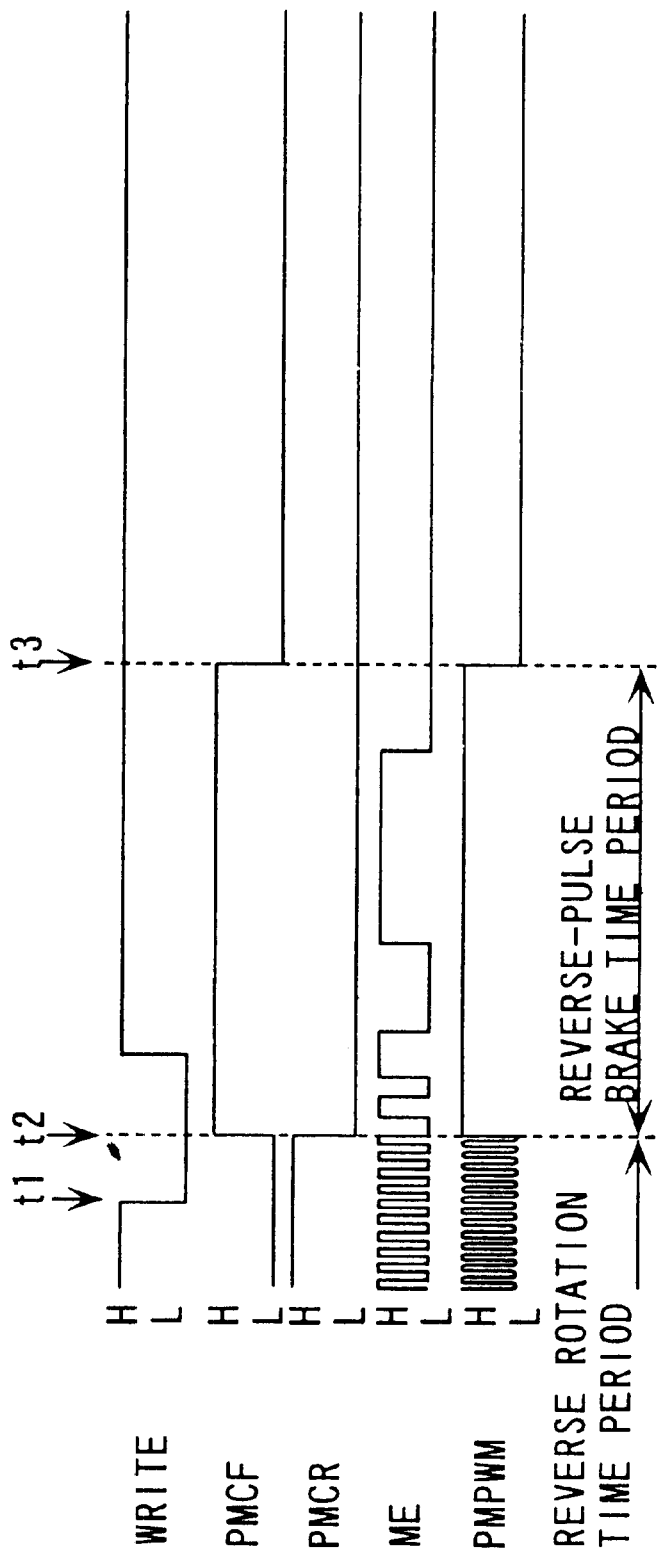

DC MOTOR CONTROL SYSTEM AND METHOD

BACKGROUND OF THE INVENTION

1. Field of the Invention

This invention relates to a DC motor control system and method, more particularly to a DC motor control system and method which controls a DC motor for driving a suction pump used in cleaning a recording head.

2. Prior Art

Conventionally, an ink jet recording apparatus is known which automatically performs a cleaning operation to ensure a positive printing operation after replacement of ink cartridges for holing ink and at the same time reliably fill a recording head of the apparatus with ink.

The term "cleaning operation" is used herein to mean sucking of ink from ink reservoirs of an ink cartridge into a cap arranged in a non-printing area of the apparatus through the nozzles of the recording head to thereby prevent the nozzles from being clogged and eliminate bubbles in an ink passage that prevent the nozzles from operating properly.

When the cleaning operation is carried out, the recording head is hermetically sealed by a cap, and negative pressure is created within a gap formed between the recording head and the cap, by a suction pump. This causes ink to be sucked from within the recording head into the cap for effecting the cleaning of the print head.

In the conventional ink jet recording apparatus, a stepping motor is used for performing the accurate control of the amount of rotation of a motor for driving the suction pump, that is, the accurate control of the amount of suction of ink.

Assuming that a recording apparatus employs a battery as a drive source, however, if the voltage of the battery becomes lower than a predetermined value of voltage required for driving the stepping motor, the apparatus ceases to function properly, and get out of control. This makes it impossible to carry out the accurate control of the amount of suction of ink.

SUMMARY OF THE INVENTION

It is a first object of the invention to provide a DC motor control system which is capable of carrying out an accurate rotation control of a DC motor even when the power supply voltage has been lowered.

It is a second object of the invention to provide a method of controlling rotation of a DC motor, which is capable of carrying out an accurate rotation control of the DC motor even when the power supply voltage has been lowered.

To attain the first object, according to a first aspect of the invention, there is provided a motor control system for carrying out rotation control of a DC motor, comprising:

detection means for detecting rotations of the DC motor and outputting a detection signal indicative of a number of the detected rotations of the DC motor; and motor stop control means which carries out stop control for stopping the DC motor by braking rotation of the DC motor when the number of the detected rotations of the DC motor indicated by the detection signal has reached a predetermined number.

To attain the first object, according to a second aspect of the invention, there is provided a DC motor control system for carrying out rotation control of a DC motor, comprising:

detection means for detecting rotations of the DC motor and outputting a pulse signal having a number of pulses corresponding in number to the number of the detected rotations, determination means for determining whether or not a count of the pulses of the pulse signal is equal to a reference count;

drive current control means for controlling a drive current supplied to the DC motor by effecting pulse width modulation control of the drive current; and motor stop control means which carries out stop control, via the drive current control means, for stopping the DC motor by braking rotation of the DC motor when the count of the pulses of the pulse signal becomes equal to the reference count.

Preferably, when the DC motor starts to rotate, the drive current control means maintains a pulse width at its maximum value, thereby maintaining the drive current at its maximum amount during a time period from a point in time at which the DC motor starts to rotate to a point in time at which the count of the pulses reaches a predetermined initial count.

Preferably, the detection means comprises a rotary encoder, and wherein the pulse signal has one or a plurality of pulses per one rotation of the DC motor.

Preferably, the DC motor control system includes rotational speed detection means for detecting a rotational speed of the DC motor by measuring an interval from one timing of transition from one signal level to another signal level and next timing of the transition from the one signal level to the another signal level, and rotational speed comparison means for comparing the rotational speed of the DC motor detected by the rotational speed detection means with a reference rotational speed, and the drive current control means controls the drive current based on a result of the comparison.

More preferably, the DC motor control system includes reference rotational speed data storage means for storing reference rotational speed data representative of the reference rotational speed.

Further preferably the reference rotational speed data storage means includes normal rotation reference rotational speed data storage means for storing the reference rotational speed data for normal rotation of the DC motor, and reverse rotation reference rotational speed data storage means for storing the reference rotational speed data for reverse rotation of the DC motor.

Preferably, the motor stop control means includes brake time period storage means for storing in advance a brake time period over which rotation of the DC motor is braked, and drive current supply stop means for stopping supply of the drive current to the DC motor after a lapse of the brake time period.

To attain the second object, according to a third aspect of the invention, there is provided a method of controlling rotation of a DC motor, comprising the steps of:

detecting rotations of the DC motor and outputting a detection signal indicative of a number of the detected rotations of the DC motor; and carrying out stop control for stopping the DC motor by braking rotation of the DC motor when the number of the detected rotations of the DC motor indicated by the detection signal has reached a predetermined number.

To attain the second object, according to a fourth aspect of the invention, there is provided a method of controlling rotation of a DC motor, comprising the steps of:

detecting rotations of the DC motor and outputting a pulse signal having a number of pulses corresponding in number to the number of the detected rotations, determining whether or not a count of the pulses of the pulse signal is equal to a reference count;

controlling a drive current supplied to the DC motor by effecting pulse width modulation control of the drive current; and carrying out stop control for stopping the DC motor by braking rotation of the DC motor when the count of the pulses of the pulse signal becomes equal to the reference count.

Preferably, the step of controlling the drive current includes, when the DC motor starts to rotate, maintaining a pulse width at its maximum value, thereby maintaining the drive current at its maximum amount, during a time period from a point in time at which the DC motor starts to rotate to a point in time at which the count of the pulses reaches a predetermined initial count.

Preferably, the DC motor includes a rotary encoder for generating the pulse signal, and the pulse signal has one or a plurality of pulses per one rotation of the DC motor.

Preferably, the method further includes the steps of detecting a rotational speed of the DC motor by measuring an interval from one timing of transition from one signal level to another signal level and next timing of the transition from the one signal level to the another signal level, and comparing the detected rotational speed of the DC motor with a reference rotational speed, and the step of controlling the drive current includes controlling the drive current based on a result of the comparison.

Preferably, the step of carrying out the stop control comprises the steps of storing in advance a brake time period over which rotation of the DC motor is braked, and stopping supply of the drive current to the DC motor after a lapse of the brake time period.

The above and other objects, features, and advantages of the invention will become more apparent from the following detailed description taken in conjunction with the accompanying drawings.

BRIEF DESCRIPTION OF THE DRAWINGS

FIG. 11 shows a table useful in explaining the relationship between signal levels at control input terminals of the DC motor driver and signal levels at drive current output terminals of the same;

FIG. 13 is a timing chart showing operations of the DC motor control system in a case in which stop designation is carried out during the normal rotation of a DC motor; and FIG. 14 is a timing chart showing operations of the DC motor control system in a case in which stop designation is carried out during the reverse rotation of the DC motor.

DETAILED DESCRIPTION

The invention will now be described in detail with reference to drawings showing an embodiment thereof.

Figure 1:
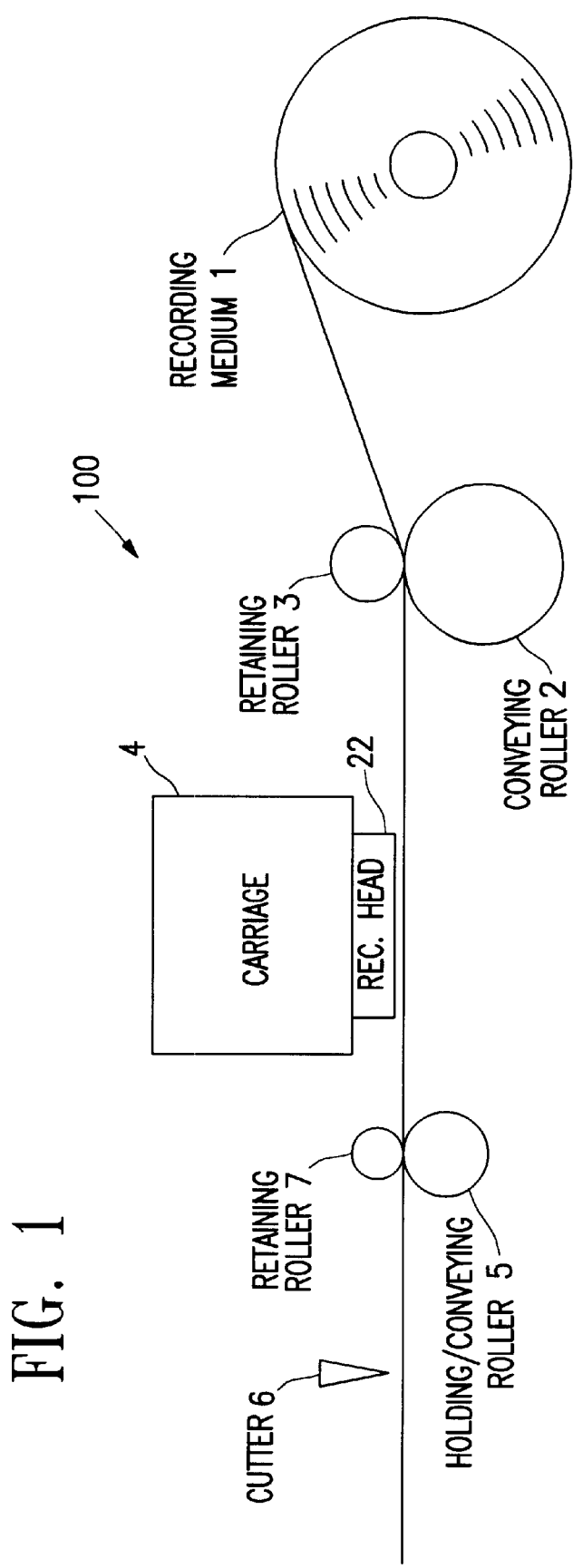
FIG. 1 is a diagram schematically showing the arrangement of an ink jet recording apparatus incorporating a DC motor control system according to an embodiment of the invention.

FIG. 1 is a diagram schematically showing the arrangement of essential elements of an ink jet recording apparatus incorporating an DC motor control system according to an embodiment of the invention.

The ink jet recording apparatus 100 is comprised of a roll of a recording medium 1 in the form of a tape as a printing object on which printing is to be effected, a conveying roller 2 for applying a force for conveying the recording medium 1 to the same, a retaining roller 3 which is arranged in a manner opposed to the conveying roller 2 for retaining the recording medium 1 when it is conveyed, a carriage 4 for driving a recording head 22, described hereinafter, in a direction orthogonal to the direction of conveying the recording medium 1, a holding/conveying roller 5 which holds the recording medium 1 by a predetermined tension when printing on the medium is carried out by the recording head 22 and at the same time applies a conveying force for conveying the medium to the same, a cutter 6 for cutting off a printed portion of the recording medium 1, and a retaining roller 7 which is arranged in a manner opposed to the holding/conveying roller 5 for retaining the recording medium 1 when it is conveyed.

Although in this embodiment, a recording medium having an adhesive layer covered with a peel-off paper on an underside surface thereof is used as the recording medium 1, this is not limitative, but a sheet in the form of a tape without the adhesive layer or the peel-off paper may be employed.

Next, a printing mechanism of the inject recording apparatus 100 and component parts associated therewith will be described with reference to FIG. 2.

As shown in the figure, the carriage 4 is supported on a guide member 26 such that the same is capable of moving along the guide member 26. Further, the carriage 4 is connected to a carriage drive motor 21 via a timing belt 20. The carriage 4 is configured such that when the carriage drive motor 21 rotates, the carriage 4 can be moved in directions indicated by a two-headed arrow in the figure (in directions perpendicular to the plane of the sheet of FIG. 1) in accordance with the movement of the timing belt 20. This configuration enables the carriage 4 to travel in an area including a printing area above a platen 5 where the printing mechanism performs printing on the recording medium 1 and a non-printing area on the right-hand side of the printing area as viewed in the figure.

Arranged on a surface of the carriage 4 facing the tape 1 is a recording head (ink jet recording head) 22 including an array of the openings of nozzles for discharging ink therefrom. Further, the carriage 4 has an ink cartridge 23 loaded therein. Ink supplied from the ink cartridge 23 to the recording head 22 is pressurized by piezoelectric elements, heating elements or the like to be ejected from the array of the nozzle openings of the recording head 22 to effect the printing.

Figure 2:
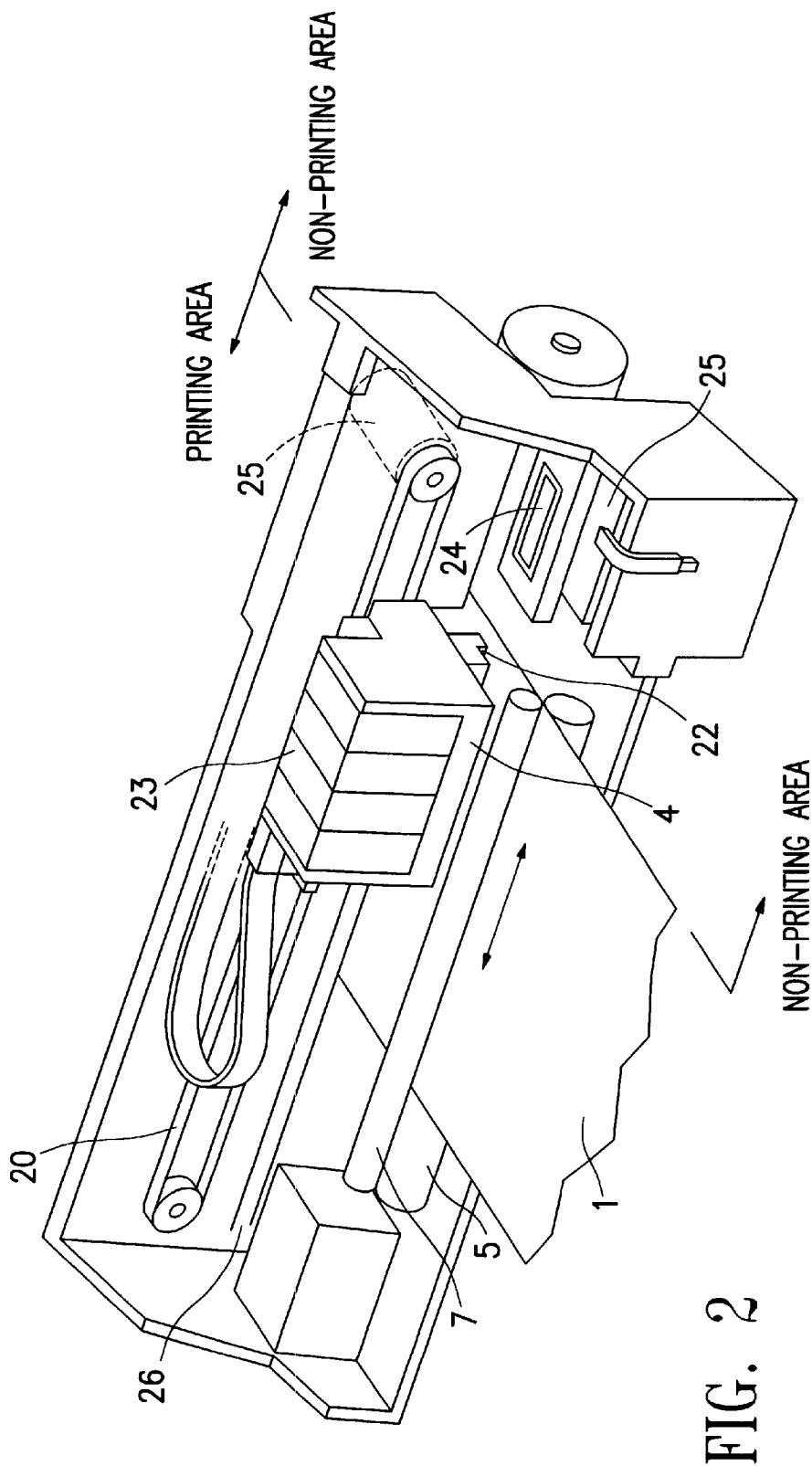
FIG. 2 is a perspective view of a printing mechanism of the FIG. 1 ink jet recording apparatus, and component parts associated therewith.

In the non-printing area, located on a right end side as viewed in FIG. 2, of the area where the carriage 4 can be moved, there is arranged a capping device (capping member) 24.

Figure 3:
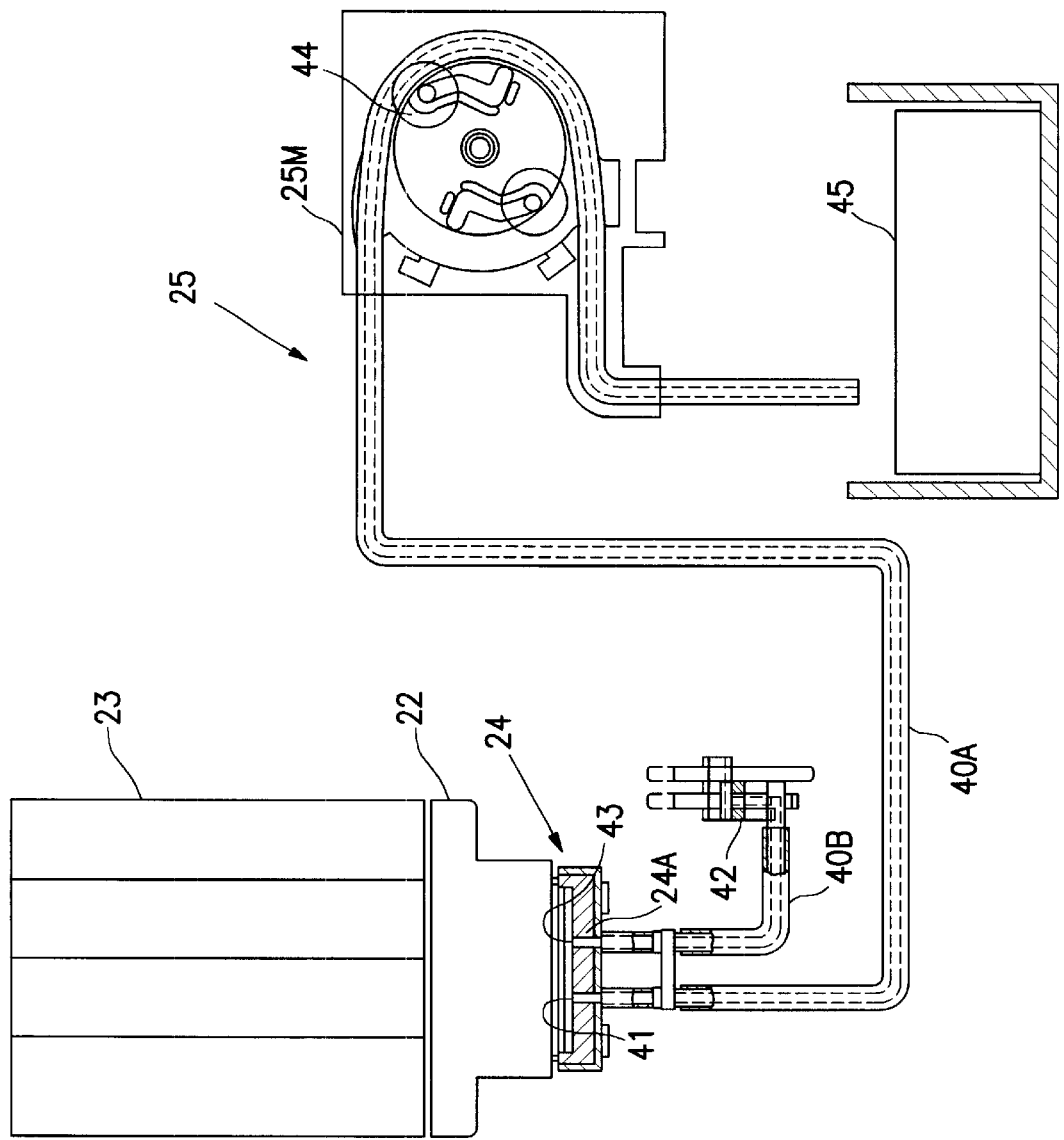
FIG. 3 is a diagram schematically showing the arrangement of a capping device of the FIG. 1 ink jet recording apparatus and component parts associated therewith.

FIG. 3 is a diagram schematically showing the arrangement the capping device and component parts associated therewith.

The capping device 24 has a capping block 24A for sealing the array of the nozzle openings of the recording head 22 having the ink cartridge 23 mounted thereon. When the power is off, the carriage 4 is positioned above the capping device 24, and the array of the nozzle openings of the recording head 22 is hermetically closed by the capping device 24 to make airtight the nozzles of the recording head 22 closed by the capping device 24.

Further, also when the cleaning of the recording head 22 is carried out, the carriage 4 is positioned above the capping device 24, and the array of the nozzle openings of the recording head 22 is hermetically closed by the capping device 24 to make airtight the nozzles. When the array of the nozzle openings of the recording head 22 is hermetically closed, negative pressure is applied to the inside of the capping device 24 by a pump (suction pump) 25 connected to the capping block 24A via a tube 40A, whereby ink in the recording head 22 is sucked into the capping device 24.

On the other hand, when the array of the nozzle openings of the recording head 22 is not closed, that is, when the array of the nozzle openings is open, the pump 25 causes negative pressure to be applied to the inside of the tube 40A, whereby ink remaining in the capping device 24 can be sucked (hereinafter referred to as "the air suction").

The capping block 24A includes an ink discharge port 41 connected to the pump 25 via the tube 40A for use in sucking ink, and an air introduction port 43 connected to a valve 42 via the tube 40B.

The valve 42 is controlled so as to progressively introduce air into a gap formed between the capping block 24A and the recording head 22, when the line of the nozzle openings of the recording head 22 is made open after it is hermetically closed by the capping device 24 to make airtight the nozzles.

The pump 25 performs suction of ink by rotation of a pulley 44 driven by a DC motor 25M as a drive source to continually crush the flexible tube 40A by the rotational movement of the pulley 44, whereby ink is sent to a waste ink-absorbing substance 45. The amount of rotation of the pulley 44, that is, the number of rotations of the DC motor 25M is proportional to the amount of ink sucked. Therefore, the amount of ink sucked by the pump 25 can be controlled with ease.

Although in the above description, a so-called tube pump is employed as the pump 25, this is not limitative, but the ink jet recording apparatus 100 can be configured such that a suction pump, such as a piston pump, a bellows pump or the like, is used the pump 25.

Figure 4:
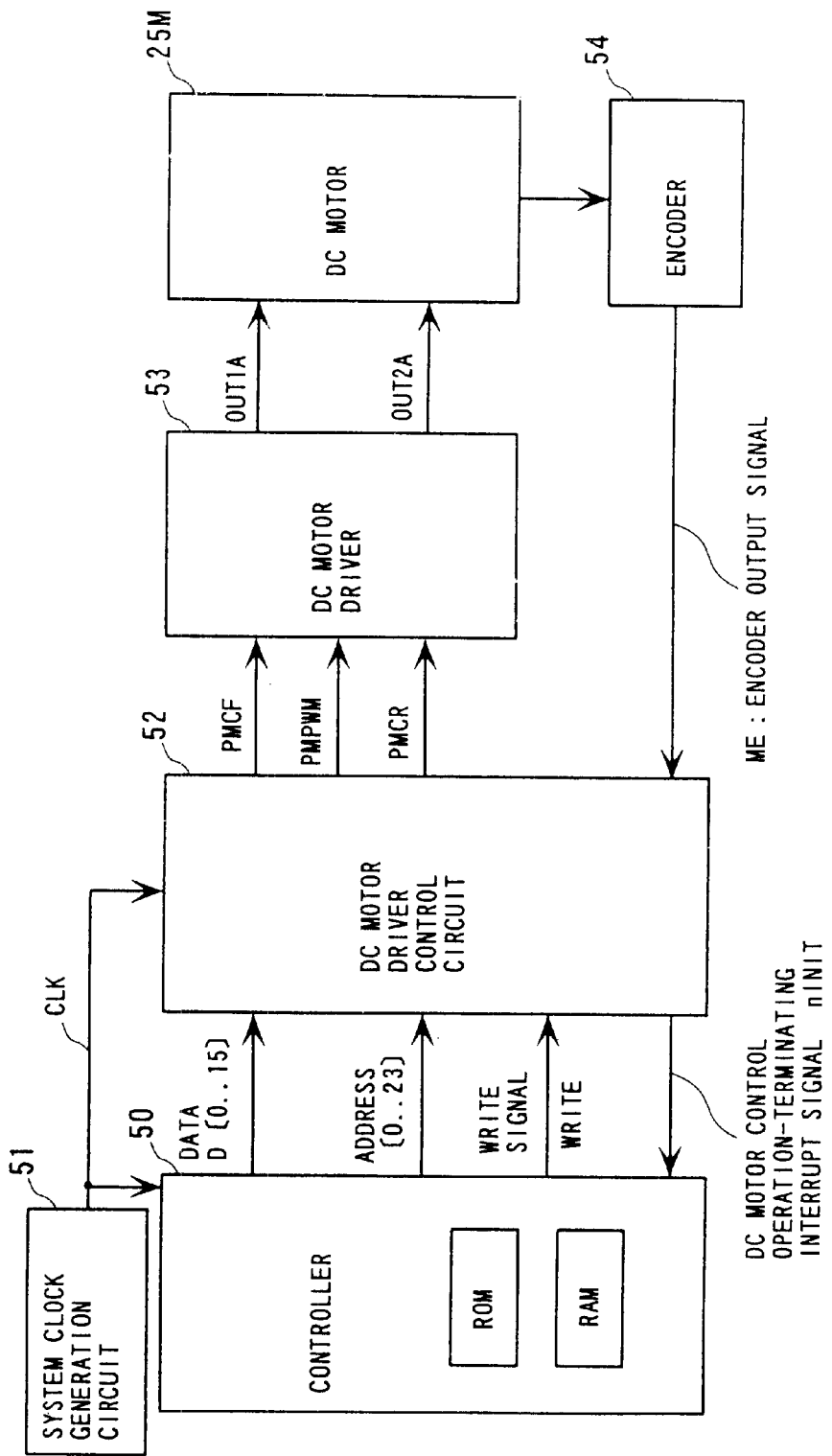
FIG. 4 is a block diagram schematically showing the arrangement of the DC motor control system according to the embodiment.

Next, the arrangement of the DC motor control system of the ink jet recording apparatus 100 will be described with reference to FIG. 4.

The DC motor control system of the ink jet recording apparatus 100 is comprised of a controller 50 having a ROM 50A for storing a control program and control data and a RAM 50B for temporarily storing various kinds of data, for controlling the whole control system, a system clock generation circuit 51 for supplying a system clock CLK to the rest of the DC motor control system, a DC motor driver control circuit 52 for controlling a DC motor driver 53, described hereinafter, the DC motor driver 53 for actually driving the DC motor 25M, and an encoder 54 for detecting the rotational state of the DC motor 25M to output an encoder output signal ME.

Now, data D written into the DC motor driver control unit by the controller 50 will be described in detail, before carrying out detailed description of the arrangement of the DC motor control system.

The data D are classified into the following seven kinds. In the following description, the values of write addresses A and data bit length are set forth only by way of example, and the invention is by no means limited to these values.

(1) Data of a normal rotational speed of the DC motor

Used for setting the rotational speed of the DC motor 25M in the normal direction.

Write address A=FF0030h (corresponding to a normal rotation DC motor speed register 65, described hereinbelow. Alphabetic letter h indicates that the digits are hexadecimal).

Data bit length=16 bits

Set a value X corresponding to a comparative time period for comparison with a time period from a rise of a pulse of the encoder output signal ME to a rise of the next pulse of the same.

More specifically, if a reference comparative time period is set to 800 [nsec] (reference comparative time period is assumed to be set in advance), the comparative time period= 800×X [nsec] is set.

(2) Data of a reverse rotational speed of the DC motor

Used for setting the rotational speed of the DC motor 25M in the reverse direction.

Write address A=FF0032h (corresponding to a reverse rotation DC motor speed register 66, described hereinafter).

Data bit length=16 bits

Set a value X corresponding to the comparative time period for comparison with a time period from a rise of a pulse of the encoder output signal ME to a rise of the next pulse of the same.

More specifically, if a reference comparative time period is set to 800 [nsec] (reference comparative time period is assumed to be set in advance), the comparative time period= 800×X [nsec] is set.

(3) Data of a reverse pulse time period for braking the DC motor

Used for setting a time period over which brake pulses are delivered to stop the DC motor 25M, after the motor is rotated by a predetermined amount of rotation corresponding to a predetermined number of pulses of the encoder output signal ME.

Write address A=FF0034h (corresponding to a brake time reverse pulse-setting register 62, described hereinafter).

Data bit length=16 bits

Set a value X corresponding to a reverse-pulse brake time period.

More specifically, if a reference reverse-pulse brake time period is set to 819.2 [$\mu$sec] (the reference reverse-pulse brake time period is assumed to be set in advance), the reverse-pulse brake time period=819.2×X [$\mu$sec] is set.

(4) Data of PWM+ control amount

Used for setting an increased pulse width for increasing the rotational speed of the DC motor 25M, in the pulse width modulation control of the DC motor 25M, when the actual rotational speed of the motor is lower than a desired rotational speed.

Write address A=FF0038h (corresponding to a PWM+ control amount register 63, described hereinafter)

Data bit length=16 bits

Set a value PWM+ corresponding to the increased pulse width.

More specifically, a time period Tpwm corresponding to the increased pulse width is represented by the following equation:

$$Tpwm=(PWM+)\times 100[nsec]$$

(5) Data of PWM− control amount

Used for setting a decreased pulse width for reducing the rotational speed of the DC motor 25M, in the pulse width modulation control of the DC motor 25M, when the actual rotational speed of the motor is higher than a desired rotational speed.

Write address A=FF003Ah (corresponding to a PWM− control amount register 64, described hereinbelow)

Data bit length=16 bits

Set a value PWM− corresponding to the decreased pulse width.

More specifically, a time period Tpwm corresponding to the decreased pulse width is represented by the following equation:

$$Tpwm=(PWM-)\times 100[nsec]$$

(6) Data of a motor operation time period

Used for setting an operation time period of the DC motor 25M from a time of the start of the rotation thereof to a time of starting a stop control of the same, to cause the motor to rotate by the predetermined amount of rotation corresponding to the predetermined number of pulses of the encoder output signal ME.

Write address A=FF003Ch (corresponding to a motor operation time period-setting register 67, described hereinafter)

Data bit length=16 bits

Set the count of rises of the encoder output signal ME, i.e. the predetermined number of pulses of the encoder output signal ME.

When the direction of the rotation of the DC motor 25M is designated based on rotational direction data, described hereinafter, the rise timing of the encoder output signal ME starts to be counted. When the count of rises of the signal ME reaches a count corresponding to the data of the motor operation time period, the stop control of the DC motor 25M starts to be carried out.

This value is maintained until the data of the motor operation time period is updated.

(7) Rotational direction data

Used for setting the rotational operation mode and the rotational direction of the DC motor M25.

Write address A=FF0036h (corresponding to a rotational direction specification register 61, described hereinafter)

Data bit length=16 bits. In the embodiment, only the three least significant bits are actually used.

According to the values of the three least significant bits, the rotational operation mode and the rotational direction of the DC motor M25 are set as follows, wherein the first bit (=LSB) of the data is represented by b0, the second bit by b1, and the third bit by b2.

Value=0 (b2=0, b1=0, b0=0): duty normal rotation mode.
Value=1 (b2=0, b1=0, b0=1): duty reverse rotation mode.
Value=2 (b2=0, b1=1, b0=0): stop (stop of rotation).
Value=4 (b2=1, b1=0, b0=0): normal rotation mode.
Value=5 (b2=1, b1=0, b0=1): reverse rotation mode.

In this embodiment, the duty normal (reverse) rotation mode is used to mean an operation mode which carries out rotation control according to duty ratio of a pump motor pulse width control signal PMPWM, described hereinafter.

Next, the configuration of the DC motor driver control circuit 52 will be described.

Figure 5:
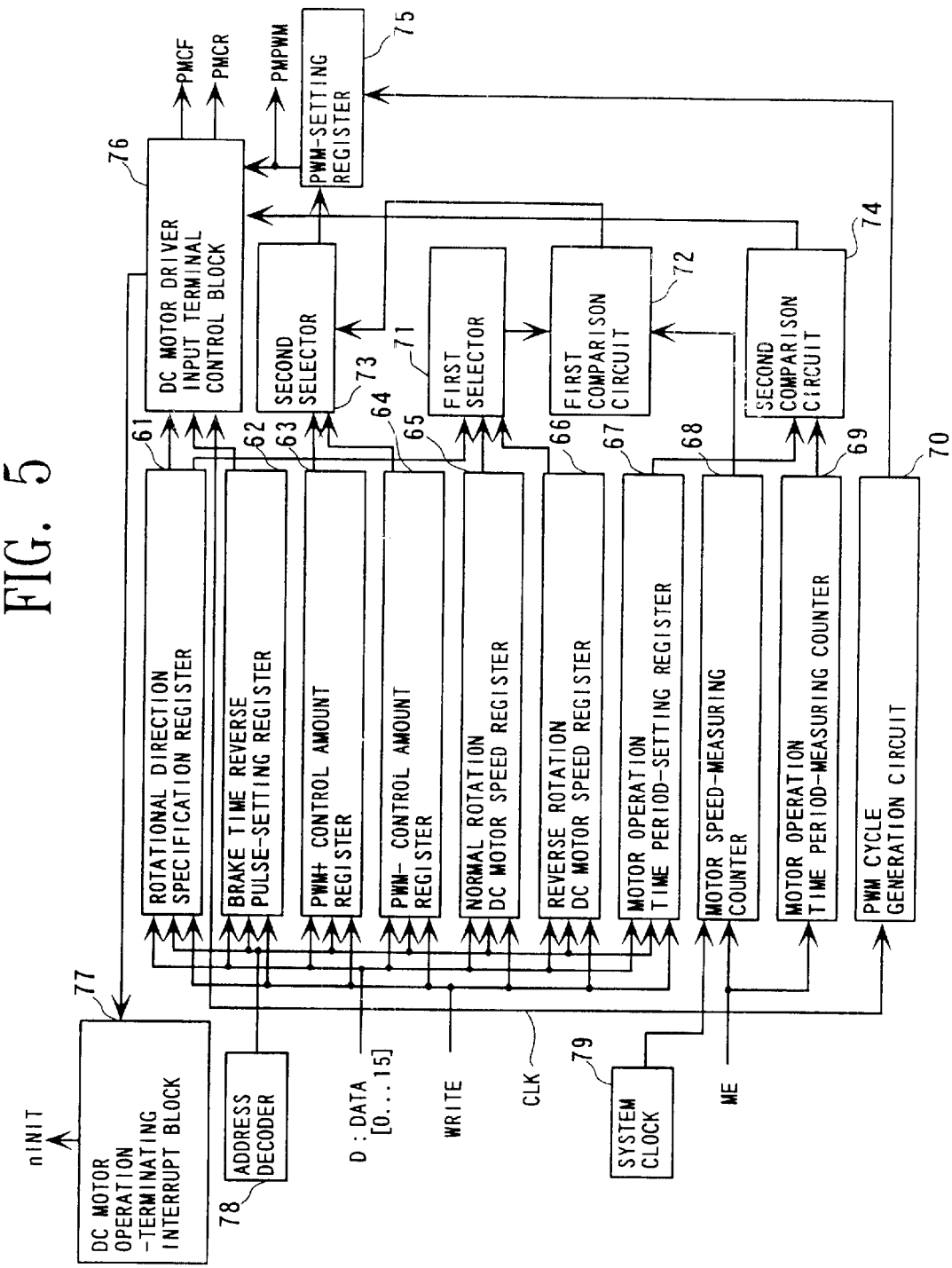
FIG. 5 is a block diagram schematically showing the configuration of a DC motor driver control circuit appearing in FIG. 4.

FIG. 5 is a block diagram schematically showing the configuration of the DC motor driver control circuit 5.

The DC motor driver control circuit 52 is comprised of the rotational direction specification register 61 for storing the rotational direction data, the brake time reverse pulse-setting register 62 for storing the data of the brake time reverse pulse time period (hereinafter referred to as "the brake time reverse pulse time period") for braking the DC motor, the PWM+ control amount register 63 for storing the data of PWM+ control amount(hereinafter referred to as "the PWM+ control amount data"), the PWM− control amount register 64 for storing the data of PWM− control amount (hereinafter referred to as "the PWM− control amount data"), the normal rotation DC motor speed register 65 for storing the data of the normal rotation DC motor speed, the reverse rotation DC motor speed register 66 for storing the data of the reverse rotation DC motor speed, the motor operation time period-setting register 67 for storing the data of the motor operation time period, and a motor speed-measuring counter 68 which performs a counting operation for measuring a motor speed corresponding to an actual rotational speed of the DC motor based on the system clock CLK and the encoder output signal ME and stores motor speed measurement count data obtained.

Further, the DC motor driver control circuit 52 includes a motor operation time period-measuring counter 69 which performs a counting operation for measuring a motor operation time period corresponding to an actual operation time period of the DC motor based on the rise timing of the encoder output signal ME and stores operation time measurement count data obtained, a PWM cycle generation circuit 70 which generates a pulse width modulation (PWM) cycle based on the system clock CLK and outputs a latch signal DLT corresponding to the data latch timing of a PWM-setting register 75, described hereinbelow, and a first selector 71 which selectively outputs one of the data of the normal rotation DC motor speed (hereinafter referred to as "the normal rotation DC motor speed data") stored in the normal rotation DC motor speed register 65 and the data of the reverse rotation DC motor speed (hereinafter referred to as "the reverse rotation DC motor speed data") stored in the reverse rotation DC motor speed register 66, based on the rotational direction data stored in the rotational direction specification register 61.

Further, the DC motor driver control circuit 52 includes a first comparison circuit 72 which compares the output data (normal rotation DC motor speed data or reverse rotation DC motor speed data) of the first selector 71 with the motor speed measurement count data to determine which data represents a higher speed and outputs PWM control amount selection data SEL, a second selector 73 which selectively delivers one of the PWM+ control amount data stored in the PWM+ control amount register 63 and the PWM− control amount data stored in the PWM− control amount register 64 in response to the PWM control amount selection data SEL, and a second comparison circuit 74 which compares the data of the motor operation time period (hereinafter referred to as "the motor operation time period data") stored in the motor operation time period-setting register 67 with the operation time period measurement count data stored in the motor operation time period-measuring counter 69, and delivers a stop control signal STP for causing the stop control to be performed, when the operation time period data and the operation time period measurement count data coincides with each other.

Furthermore, the DC motor driver control circuit 52 includes a PWM-setting register 75 which latches the PWM+ control amount data or the PWM− control amount data selectively delivered from the second selector 73 in a timing corresponding to the latch signal DLT, and generates and maintains the pump motor pulse width control signal PMPWM, a DC motor driver input terminal control block 76 which carries out rotation control of the DC motor 25M by generating and delivering a pump motor normal rotation control signal PMCF or a pump motor reverse rotation control signal PMCR based on the rotational direction data stored in the rotational direction specification register 61 and the pump motor pulse width control signal PMPWM delivered from the PWM-setting register 75, and also carries out stop control of the DC motor 25M by generating and delivering the pump motor normal rotation control signal PMCF or the pump motor reverse rotation control signal PMCR based on the stop control signal STP and the brake time reverse pulse time period data stored in the brake time reverse pulse-setting register 62, a DC motor operation-terminating interrupt block 77 which generates and delivers a DC motor operation-terminating interrupt signal nINIT under the control of the DC motor driver input terminal control block 76, and an address decoder 78 which decodes write address data A received.

In this embodiment, when normal rotation or reverse rotation is designated by the rotational direction data, the pump motor pulse width control signal PMPWM maintains "H" level until the encoder output signal ME rises three times to start the DC motor 25M, and after starting the motor, it refers to the encoder output signal ME to carry out PWM control by monitoring the rotational speed of the DC motor 25M. The frequency of PWM used in the PWM control is set to 9.76 [kHz] (period of 102.4 [μsec]), for instance.

Figure 6:
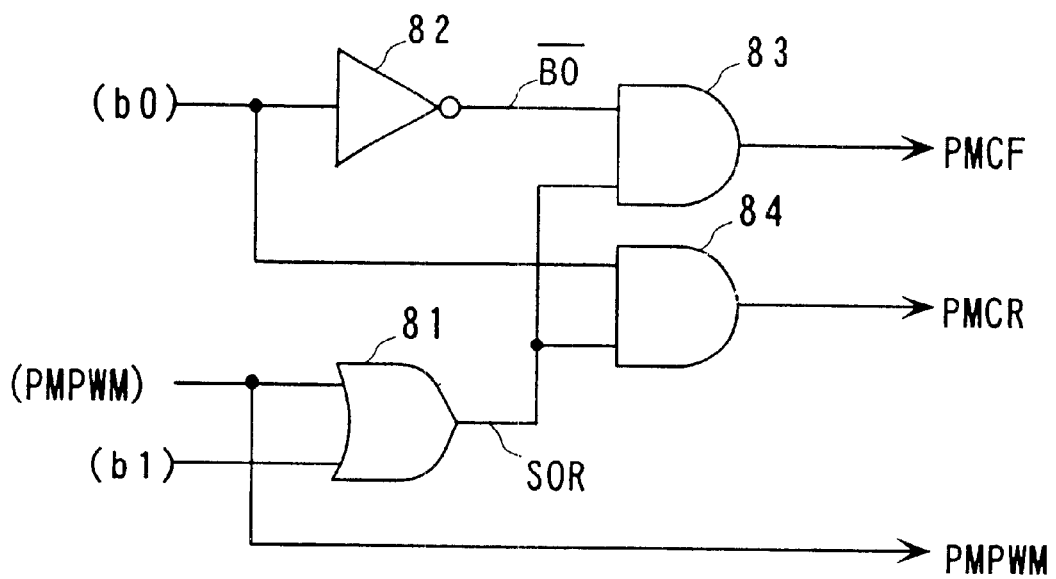
FIG. 6 is a block diagram schematically showing the construction of a DC motor driver input terminal control block appearing in FIG. 5.

FIG. 6 schematically shows the construction of the DC motor driver input terminal control block 76.

The DC motor driver input terminal control block 76 is comprised of an OR circuit 81 which includes one input terminal for receiving the pump motor pulse width control signal PMPWM and the other input terminal for receiving the third bit b2 (if b2=0, duty rotation is designated) of the rotational direction data as well as an output terminal for delivering a logical sum (OR) signal SOR, a NOT circuit 82 which includes an input terminal for receiving the first bit b0 (if b0=0, normal rotational direction is designated) of the rotational direction data and an output terminal for delivering inverted bit data /B0 formed by inverting the received data, a first AND circuit 83 which includes one input terminal for receiving the inverted bit data /B0, the other input terminal for receiving the logical sum signal SOR, and an output terminal for delivering the logical product of the inverted bit data /B0 and the logical sum signal SOR as the pump motor normal rotation control signal PMCF, and a second AND circuit 84 which includes one input terminal for receiving the first bit b0 of the rotational direction data, the other input terminal for receiving the logical sum signal SOR, and an output terminal for delivering the logical product of the first bit b0 and the logical sum signal SOR as the pump motor reverse rotation control signal PMCR.

Figure 7:
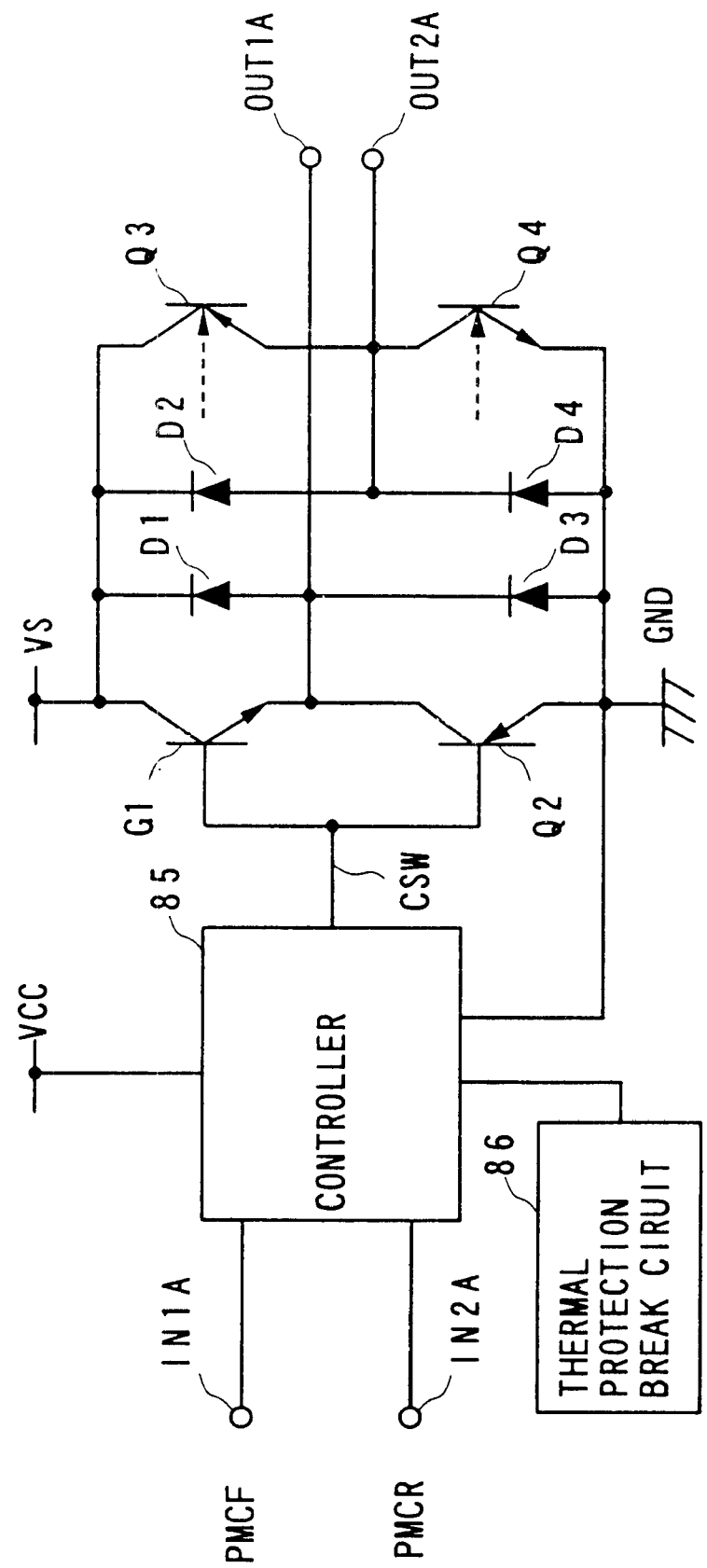
FIG. 7 is a circuit diagram schematically showing the construction of the circuit of a DC motor driver appearing in FIG. 4.

FIG. 7 schematically shows the construction of the circuit of the DC motor driver 53.

The DC motor driver 53 is comprised of transistors Q1 to Q4 serving as switching elements, a controller 85, a thermal protection break circuit 86 which interrupts drive current for stopping the DC motor 25M when the DC motor driver 53 is overheated, and diodes D1 to D4 for use in absorbing a back electromotive force. The transistor Q1 and the transistor Q4 form one pair and the transistor Q2 and the transistor Q3 form the other pair. The transistors forming one of the pairs are simultaneously turned on, and at the same time the transistors forming the other pair are simultaneously turned off, whereby the controller 85 carries out a control operation for delivering a drive current to the DC motor 25M via drive current output terminals OUT1A and OUT2A.

Figure 8:
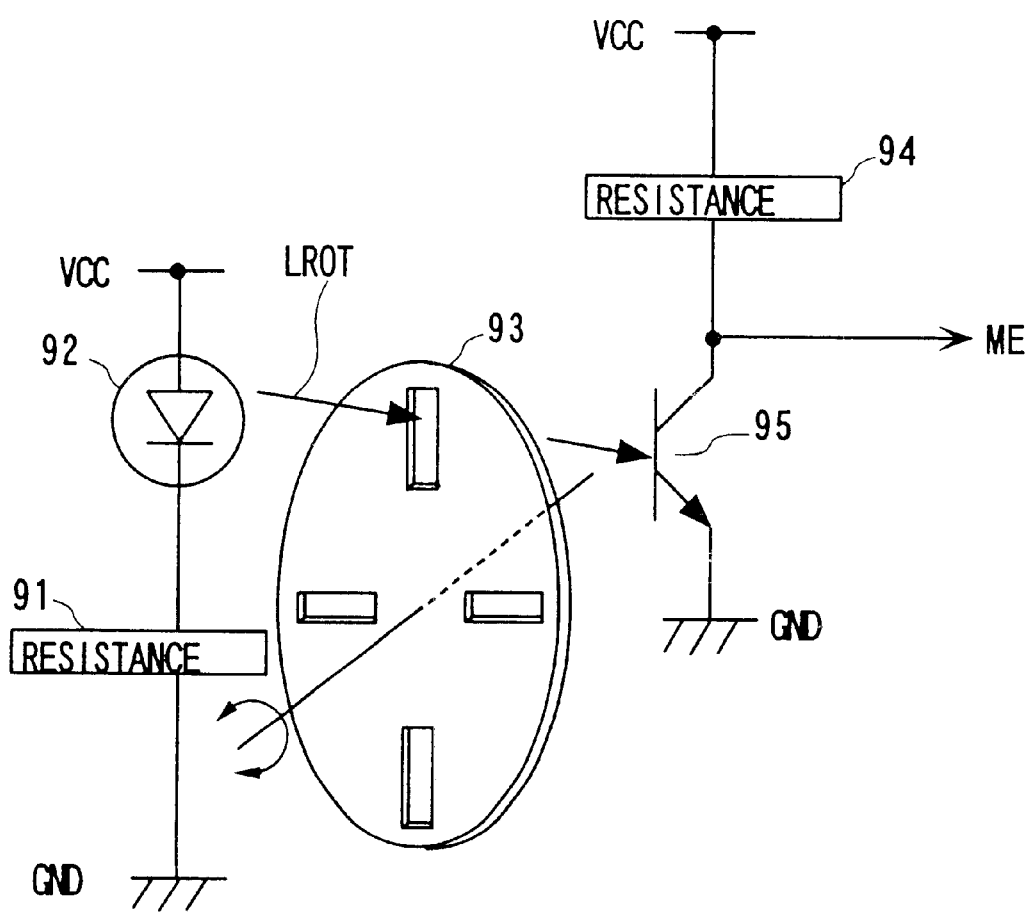
FIG. 8 is a block diagram useful in explaining the construction of an encoder appearing in FIG. 4.

FIG. 8 schematically shows the construction of the encoder 54.

The encoder 54 includes a resistance 91 having one terminal connected to the ground (GND), a LED 92 which has one terminal connected to the other terminal of the resistance 91 and the other terminal connected to the power supply VCC and emits detecting light LROT for detecting the rotational speed of the pump motor, a slit plate 93 connected to the rotational shaft of the pump motor to rotate as the shaft rotates, a resistance 94 having one terminal connected to the power supply VCC, and a photo detector 95 which has one terminal connected to the other terminal of the resistance 94 and the other terminal connected to the ground GND and receives the detecting light LROT to generate and deliver the encoder output signal ME.

Next, operation of the DC motor control system for PWM control of the DC motor will be described.

First, PWM control operations in the case of the normal rotation being designated will be described.

Figure 9:
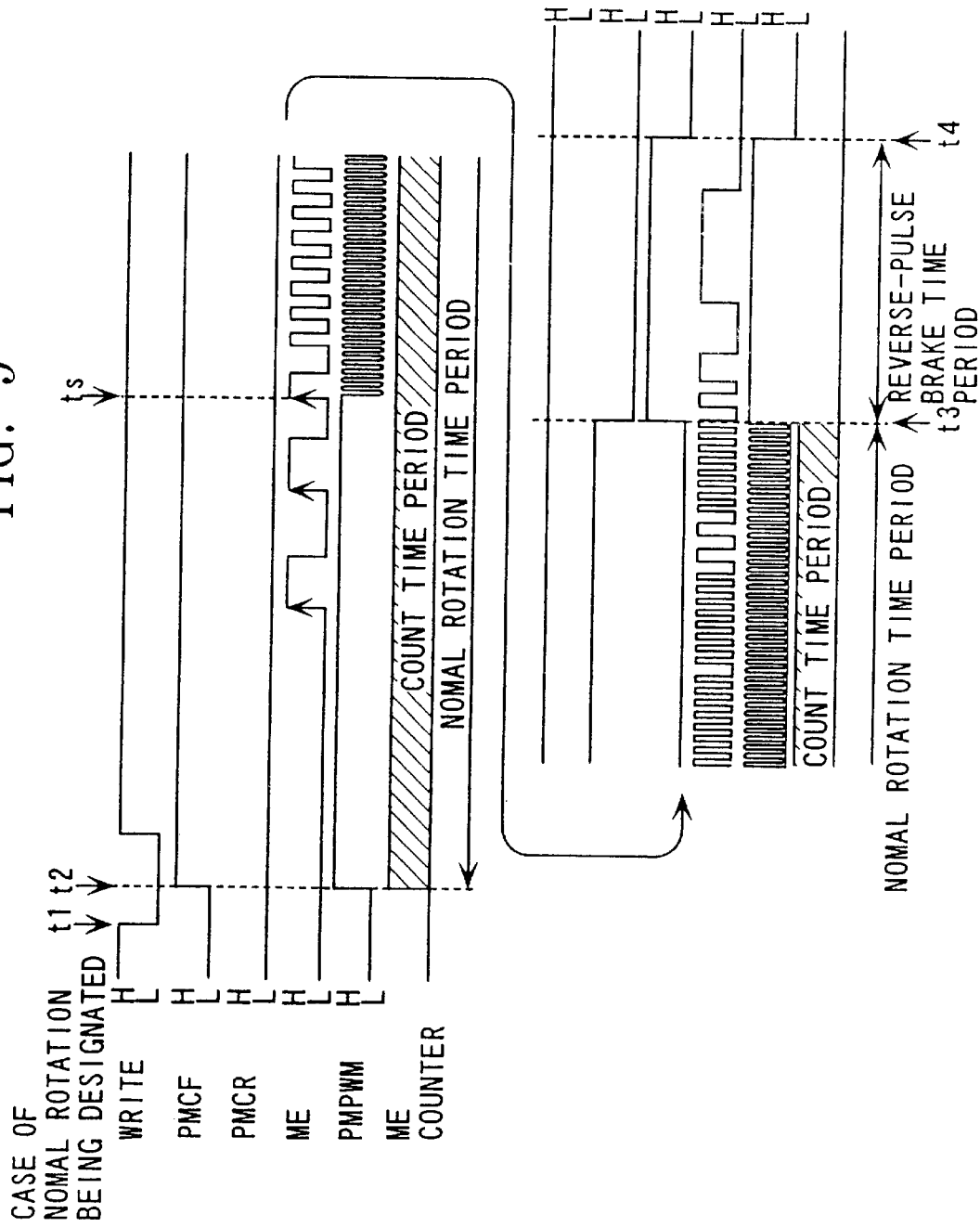
FIG. 9 is a timing chart showing operations of the DC motor control system when normal rotation is designated.

FIG. 9 is a timing chart showing the operations of the elements of the DC motor control system performed when the normal rotation is designated.

In this case, let it be assumed that the controller 50 sets in advance the brake time reverse pulse time period data to the brake time reverse pulse-setting register 62 of the DC motor driver control circuit 52, the PWM+ control amount data to the PWM+ control amount register 63, the PWM− control amount data to the PWM− control amount register 64, the normal rotation DC motor speed data to the normal rotation DC motor speed register 65, the reverse rotation DC motor speed data to the reverse rotation DC motor speed register 66, and the motor operation time period data to the motor operation time period-setting register 67. Further, the encoder output signal ME is assumed to be initially at "L" level.

First, the controller 50 deliveries data D (=4), i.e. rotational direction data designating the normal rotational direction and a write address A (A=FF0036h in the case of the present example) corresponding to the rotational direction specification register 61, to the DC motor driver control circuit 52.

Then, the controller 50 changes the level of a write signal WRITE to "L" level at time t1 in a timing corresponding to the system clock CLK.

This causes the DC motor driver control circuit 52 to write the data D corresponding to the rotational direction data designating the normal rotational direction in the rotational direction specification register 61.

This causes the DC motor driven input terminal control block 76 to set the pump motor normal rotation control signal PMCF at "H" level at time t2 based on the rotational direction data designating the normal rotational direction stored in the rotational direction specification register 61 and the pump motor pulse width control signal PMPWM delivered from the PWM-setting register 75 at "H" level. In this embodiment, the pump motor pulse width control signal PMPWM is configured such that the pump motor pulse width control signal PMPWM maintains the pulse width at its the maximum value to maintain the drive current at its maximum during a time period from a time the DC motor 25M starts to rotate to a time the count of pulses of the encoder output signal ME (pulse signal) reaches a predetermined initial count (three in FIG. 12). This is for accelerating the rise of rotational speed of the DC motor 25M, when the DC motor 25M is started.

More specifically, although the OR circuit 81 of the DC motor driver input terminal control block 76 receives the pump motor pulse width control signal PMPWM at one input terminal, it receives the third bit b2 (=1; normal rotation mode) of the rotational direction data at the other input terminal, so that the OR circuit 81 always outputs the logical sum signal SOR at "H" level.

The NOT circuit 82, into which the first bit b0 (=0) of the rotational direction data is entered, inverts the data and outputs the inverted bit data /B0 (="H" level).

The first AND circuit 83 outputs the logical product of the inverted bit data /B0 at "H" level and the logical sum signal SOR at "H" level to delivers the pump motor normal rotation control signal PMCF at "H" level.

As a result, the signal level at the control input terminal IN1A of the DC motor driver 53 goes high, while that at the control input terminal IN2A goes low, so that the controller 85 delivers the control signal CSW to turn on the transistor Q1 and the transistor Q4 and turn off the transistor Q2 and the transistor Q3 (see FIG. 11). Hence, the drive current flows through a current path of the power supply VS the drive current output terminal OUT1A the DC motor 25M the drive current output terminal OUT2A the ground GND, thereby causing the DC motor 25M to start normal rotation, and the encoder 54 delivers the encoder output signal ME in accordance with the normal rotation of the DC motor 25M rotates.

More specifically, the slit plate 93 starts to rotate as the rotational shaft of the DC motor 25M.

This rotation of the slit plate 93 repeatedly permits the detecting light LROT emitted by the LED 92 to reach the photo detector 95 and blocks the same, at a repetition period corresponding to the rotational speed of the DC motor 25M.

The photo detector 95 receives the detecting light LROT which has reached the same through each slit of the slit plate 93, generates the encoder output signal ME, and delivers the same to the motor speed-measuring counter 68 and the motor operation time period-measuring counter 69.

In parallel with the above operations, the first selector 71 selectively deliveries the normal rotation DC motor speed data stored in the normal rotation DC motor speed register 65 to the first comparison circuit 72, based on the rotational direction data specifying the normal rotational direction, stored in the rotational direction specification register 61.

The motor speed-measuring counter 68 performs a counting operation for measuring the motor speed corresponding to an actual rotational speed of the DC motor based on the system clock CLK and the encoder output signal ME, stores the motor speed measurement count data thus obtained, and delivers the same to the first comparison circuit 72.

The first comparison circuit 72 compares the normal rotation DC motor speed data received from the first selector 71 with the motor speed measurement count data to determine which data indicates a higher speed and delivers the PWM control amount selection data SEL to the second selector 73.

The second selector 73 selectively delivers one of the PWM+ control amount data stored in the PWM+ control amount register 63 and the PWM− control amount data stored in the PWM− control amount register 64, in response to the PWM control amount selection data SEL.

Figure 10:
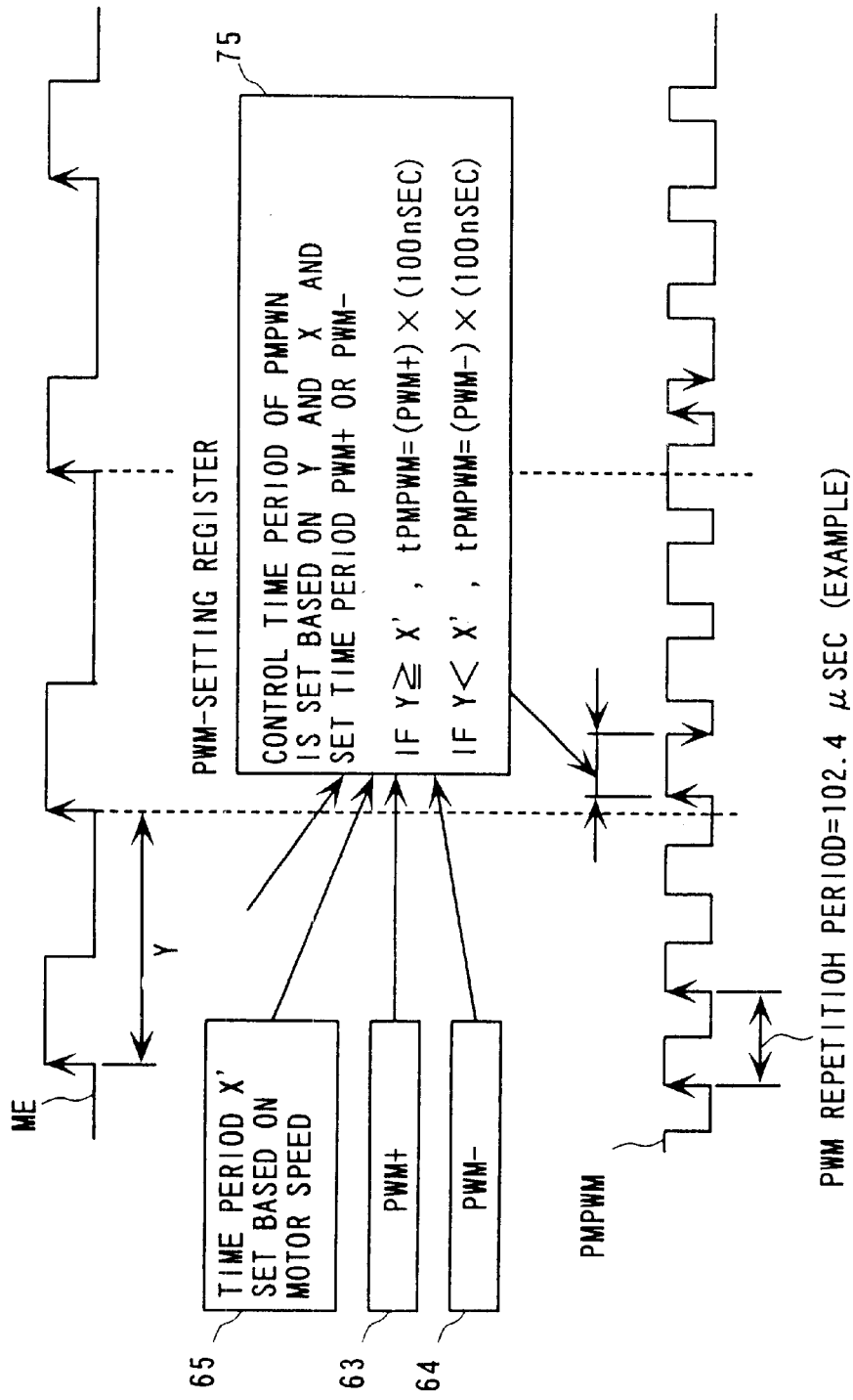
FIG. 10 is a diagram useful in explaining the relationship between an encoder output signal ME and a pump motor pulse which control signal PMPWM.

More specifically, as shown in FIG. 10, a time period Y from a rise of the encoder output signal ME to the next rise thereof and a comparative time period X' corresponding to the value X set in the normal rotation DC motor speed register 65 are compared with each other, and if $Y \geq X$ holds, the second selector 73 selectively delivers the PWM+ control amount data stored in the PWM+ control amount register 63 to the PWM-setting register 75.

On the other hand, if $Y < X$ holds, the second selector 73 selectively delivers the PWM− control amount data stored in the PWM− control amount register 64 to the PWM-setting register 75.

At this time, the PWM cycle generation circuit 70 determines a pulse width modulation (PWM) cycle based on the system clock CLK and delivers the latch signal DLT corresponding to the data latch timing of the PWM-setting register 75 to the PWM-setting register 75.

As a result, the PWM-setting register 75 receives the PWM+ control amount data or the PWM− control amount data selectively delivered by the second selector 73 in the data latch timing corresponding to the latch signal DLT.

The PWM-setting register 75 calculates a "H" level duration tPMPWM over which the pump motor pulse width control signal PMPWM is to be controlled at "H" level, based on the PWM+ control amount data or the PWM− control amount data, by using a predetermined reference "H" level duration (100 [nsec] in the present example), and holds the pump motor pulse width control signal PMPWM at "H" level over the calculated "H" level duration tPMPWM. The calculation is carried out by the following equation:

tPMPWM=(value of PWM+ control amount data)×100 [nsec] or tPMPWM=(value of PWM− control amount data)×100 [nsec]

That is, the PWM-setting register 75 calculates the tPMPWM by using one of the above equations, and delivers the pump motor pulse width control signal PMPWM held at "H" level over the duration tPMPWM to the DC motor driver input terminal control block 76.

As a result, the pump motor pulse width control signal PMPWM goes high at time t2.

Simultaneously when the pump motor pulse width control signal PMPWM goes high, the motor operation time period-measuring counter 69 starts to measure an operation time period over which the DC motor 25M is actually in operation, by counting rises of the encoder output signal ME, stores the operation time period measurement count data representative of the measured operation time period, i.e. the count of rises of the encoder output signal ME, and delivers the data to the second comparison circuit 74.

The second comparison circuit 74 compares the operation time period data stored in the motor operation time period-setting register 67 and the operation time period measurement count data stored in the motor operation time period-measuring counter 69 with each other.

Subsequently, when the operation time period data comes to agree with the operation time period measurement count data at time t3, the second comparison circuit 74 delivers the stop control signal STP to the DC motor driver input terminal control block 76 to cause the same to carry out the stop control.

The DC motor driver input terminal control block 76 sets the pump motor normal rotation control signal PMCF at "L" level and the pump motor reverse rotation control signal PMCR at "H" level, based on the stop control signal STP and the brake time reverse pulse time period data stored in the brake time reverse pulse-setting register 62.

As a result, the signal level at the control input terminal IN1A of the DC motor driver 53 goes low, while that at the control input terminal IN2A goes high (see FIG. 11), so that the controller 85 delivers the control signal CSW to turn off the transistor Q1 and the transistor Q4 and turn on the transistor Q2 and the transistor Q3. Hence, the drive current flows through a current path of the power supply VS the drive current output terminal OUT2A the DC motor 25M the drive current output terminal OUT1A the ground GND, thereby causing the DC motor 25M to start reverse rotation.

The DC motor 25M is driven for rotation in the reverse rotation direction over a time period (reverse-pulse brake time period) corresponding to the brake time reverse pulse time period data stored in the brake time reverse pulse-setting register 62, and the supply of the drive current to the pump motor 25M is stopped at time t4.

Further, during the reverse-pulse brake time period (t3 to t4), the pump motor pulse width control signal PMPWM is maintained at "H" level, and after time t4, set to "L" level.

The DC motor operation-terminating interrupt block 77 generates the DC motor operation-terminating interrupt signal nINIT under the control of the DC motor driver input terminal control block 76 and delivers the signal to the controller 50, to thereby notify the same that the operation of the pump motor 25M has been completed, followed by terminating the normal rotation control operation of the DC motor control system.

Next, PWM control operations in the case of the reverse rotation being designated will be described.

Figure 12:
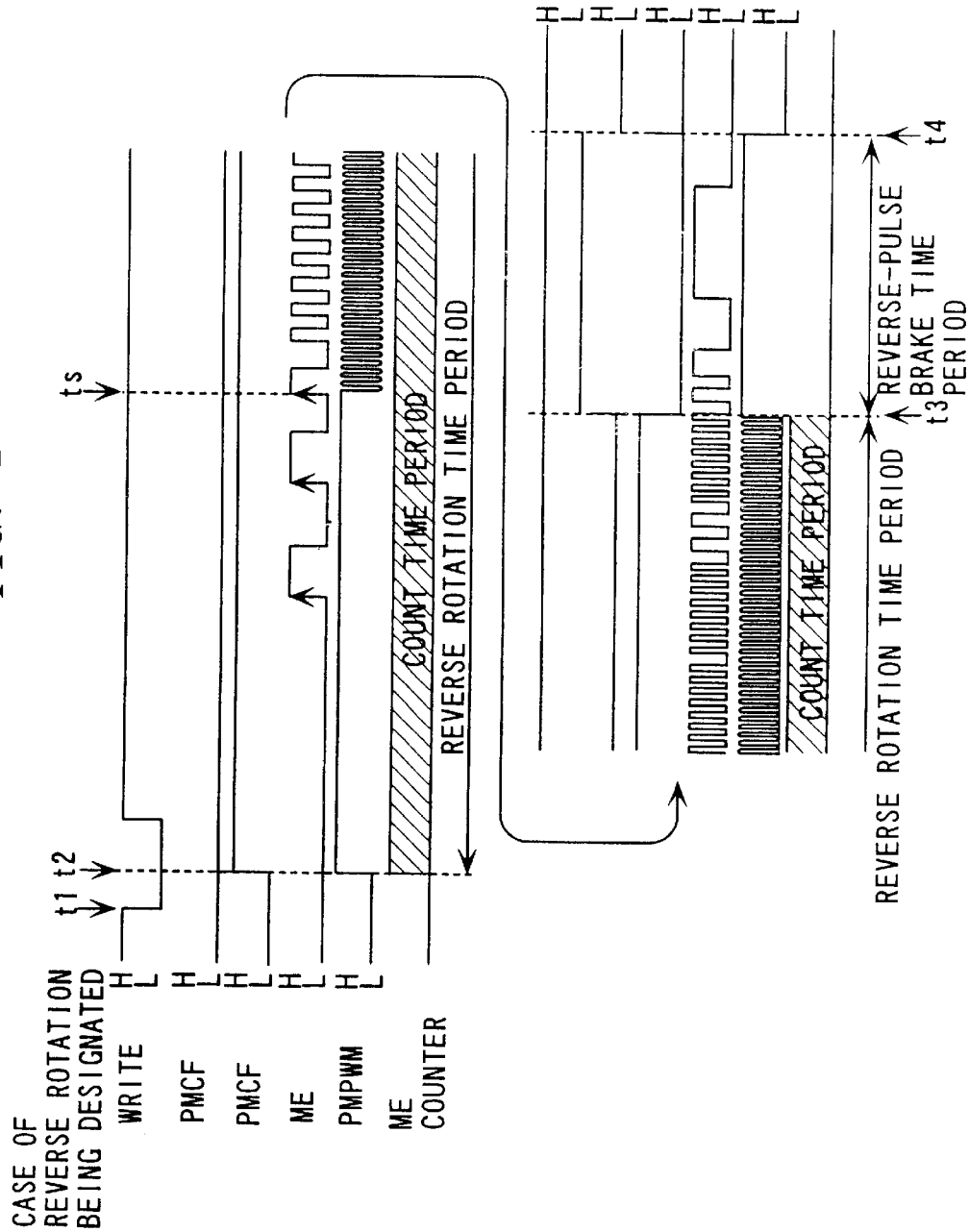
FIG. 12 is a timing chart showing operations of the DC motor control system when reverse rotation is designated.

FIG. 12 is a timing chart showing the operations of the elements of DC motor control system performed when the reverse rotation is designated.

In this case as well, let it be assumed that the controller 50 sets in advance the brake time reverse pulse time period data to the brake time reverse pulse-setting register 62 of the DC motor driver control circuit 52, the PWM+ control amount data to the PWM+ control amount register 63, the PWM− control amount data to the PWM− control amount register 64, the normal rotation DC motor speed data to the normal rotation DC motor speed register 65, the reverse rotation DC motor speed data to the reverse rotation DC motor speed register 66, and the motor operation time period data to the motor operation time period-setting register 67. Further, the encoder output signal ME is assumed to be initially at "L" level.

First, the controller 50 delivers data D (=5), i.e. rotational direction data designating the reverse rotational direction and the write address A (A=FF0036h in the case of the present example) corresponding to the rotational direction specification register 61, to the DC motor driver control circuit 52.

Then, the controller 50 changes the level of the write signal WRITE to "L" level at time t3 in a timing corresponding to the system clock CLK.

This causes the DC motor driver control circuit 52 to write the data D corresponding to the rotational direction data designating the reverse rotational direction, in the rotational direction specification register 61.

This causes the DC motor driver input terminal control block 76 to set the pump motor reverse rotation control signal PMCR at "H" level at time t2, based on the rotational direction data designating the reverse rotational direction stored in the rotational direction specification register 61 and the pump motor pulse width control signal PMPWM delivered from the PWM-setting register 75 at "H" level. In this embodiment, the pump motor pulse width control signal PMPWM is configured such that the pump motor pulse width control signal PMPWM maintains the pulse width at its the maximum value to maintain the drive current at its maximum during a time period from a time the DC motor 25M starts to rotate to a time the count of pulses of the encoder output signal ME (pulse signal) reaches a predetermined initial count (three in FIG. 12). This is for accelerating the rise of rotational speed of the DC motor 25M, when the DC motor 25M is started.

More specifically, although the OR circuit 81 of the DC motor driver input terminal control block 76 receives the pump motor pulse width control signal PMPWM at one input terminal, it receives the thirdbit b2 (=0; reverse rotation mode) of the rotational direction data at the other input terminal, so that the OR circuit 81 always outputs the logical sum signal SOR at "H" level.

On the other hand, the NOT circuit 82, into which the first bit b0 (=1) of the rotational direction data is entered, inverts the data and outputs inverted bit data /B0 (=level "L")

The second AND circuit 84 outputs the logical product of the inverted bit data /B0 at "H" level and the logical sum signal SOR at "H" level to deliver the pump motor reverse rotation control signal PMCR at "H" level.

As a result, the signal level at the control input terminal IN1A of the DC motor driver 53 goes low, while that at the control input terminal IN2A goes high, so that the controller 85 delivers the control signal CSW to turn off the transistor Q1 and the transistor Q4 and turn on the transistor Q2 and the transistor Q3 (see FIG. 11). Hence, the drive current flows through a current path of the power supply VS the drive current output terminal OUT2A the DC motor 25M the drive current output terminal OUT1A the ground GND, thereby causing the DC motor 25M to start reverse rotation, and the encoder 54 delivers the encoder output signal ME in accordance with the reverse rotation of the DC motor 25M.

More specifically, the slit plate 93 starts to rotate as the rotational shaft of the DC motor 25M rotates.

This rotation of the slit plate 93 repeatedly permits the detecting light LROT emitted by the LED 92 to reach the photo detector 95 and blocks the same, at a repetition period corresponding to the rotational speed of the DC motor 25M.

The photo detector 95 receives the detecting light LROT which has reached the same through each slit of the slit plate 93, generates the encoder output signal ME, and delivers the same to the motor speed-measuring counter 68 and the motor operation time period-measuring counter 69.

In parallel with the above operations, the first selector 71 selectively delivers the reverse rotation DC motor speed data stored in the reverse rotation DC motor speed register 66 to the first comparison circuit 72, based on the rotational direction data designating the reverse rotation direction, stored in the rotational direction specification register 61.

The motor speed-measuring counter 68 performs a counting operation for measuring the motor speed corresponding to the actual rotational speed of the DC motor based on the system clock CLK and the encoder output signal ME, stores the motor speed measurement count data thus obtained, and delivers the same to the first comparison circuit 72.

The first comparison circuit 72 compares the reverse rotation DC motor speed data received from the first selector 71 with the motor speed measurement count data to determine which data indicates a higher speed and outputs the PWM control amount selection data SEL to the second selector 73.

The second selector 73 selectively delivers one of the PWM+ control amount data stored in the PWM+ control amount register 63 and the PWM− control amount data stored in the PWM− control amount register 64, based on the PWM control amount selection data SEL.

More specifically, as shown in FIG. 10, a time period Y from a rise of the encoder output signal ME to the next rise time thereof and a comparative time period X' corresponding to the value X set in the reverse rotation DC motor speed register 66 are compared with each other, and if Y≧X holds, the second selector 73 selectively delivers the PWM+ control amount data stored in the PWM+ control amount register 63 to the PWM-setting register 75.

On the other hand, if Y<X holds, the second selector 73 selectively delivers the PWM− control amount data stored in the PWM− control amount register 64 to the PWM-setting register 75.

At this time, the PWM cycle generation circuit 70 determines the pulse width modulation (PWM) cycle based on the system clock CLK and delivers the latch signal DLT corresponding to the data latch timing of the PWM-setting register 75 to the PWM-setting register 75.

As a result, the PWM-setting register 75 receives the PWM+ control amount data or the PWM− control amount data selectively delivered by the second selector 73 in the data latch timing corresponding to the latch signal DLT.

The PWM-setting register 75 calculates a "H" level duration tPMPWM over which the pump motor pulse width control signal PMPWM is to be controlled at "H" level, based on the PWM+ control amount data or the PWM− control amount data, by using the predetermined reference "H" level duration (100 [nsec] in the present example), and holds the pump motor pulse width control signal PMPWM at "H" level over the calculated "H" level duration tPMPWM. The calculation is carried out by the following equation:

tPMPWM=(value of PWM+ control amount data)×100 [nsec] or tPMPWM=(value of PWM− control amount data)×100 [nsec]

That is, the PWM-setting register 75 calculates the tPMPWM by using one of the above equations, and delivers the pump motor pulse width control signal PMPWM held at "H" level over the duration tPMPWM to the DC motor driver input terminal control block 76.

As a result, the pump motor pulse width control signal PMPWM goes high at time t2.

Simultaneously when the pump motor pulse width control signal PMPWM goes high, the motor operation time period-measuring counter 69 starts to measure an operation time period over which the DC motor 25M is actually in operation, by counting rises of the encoder output signal ME, stores the operation time period measurement count data representative of the measured operation time period, and delivers the data to the second comparison circuit 74.

The second comparison circuit 74 compares the operation time period data stored in the motor operation time period-setting register 67 and the operation time period measurement count data stored in the motor operation time period-measuring counter 69 with each other.

Subsequently, when the operation time period data comes to agree with the operation time period measurement count data at time t3, the second comparison circuit 74 delivers the stop control signal STP to the DC motor driver input terminal control block 76 to cause the same to carry out the stop control.

The DC motor driver input terminal control block 76 sets the pump motor normal rotation control signal PMCR to "L" level and the pump motor reverse rotation control signal PMCF to "H" level, based on the stop control signal STP and the brake time reverse pulse time period data stored in the brake time reverse pulse-setting register 62.

As a result, the signal level at the control input terminal IN1A of the DC motor driver 53 goes high, while that at the control input terminal IN2A goes low (see FIG. 11), so that the controller 85 turn off delivers the control signal CSW to the transistor Q1 and the transistor Q4 and turn on the transistor Q2 and the transistor Q3. Hence, the drive current flows through a current path of the power supply VS the drive current output terminal OUT1A the DC motor 25M the drive current output terminal OUT2A the ground GND, thereby causing the DC motor 25M to start reverse rotation operation.

The DC motor 25M is driven for rotation in the normal rotation direction over a time period (reverse-pulse brake time period) corresponding to the brake time reverse pulse time period data stored in the brake time reverse pulse-setting register 62, and the supply of the drive current to the pump motor 25M is stopped at time t4.

Further, during the reverse-pulse brake time period (t3 to t4), the pump motor pulse width control signal PMPWM is maintained at "H" level, and after time t4, set to "L" level.

The DC motor operation-terminating interrupt block 77 generates the DC motor operation-terminating interrupt signal nINIT under the control of the DC motor driver input terminal control block 76 and delivers the signal to the controller 50, to thereby notify the same that the operation of the pump motor 25M has been completed, followed by terminating the reverse rotation control operation of the DC motor control system.

Next, operations of the DC motor control system carried out in response to designation of stoppage during the normal rotation or the reverse rotation thereof for forcibly stopping the DC motor 25M will be described.

First, operations responsive to the designation of stoppage during the normal rotation of the DC motor 25M will be described.

FIG. 13 is a timing chart showing these operations during normal rotation of the DC motor.

In this case, it is assumed that the brake time reverse pulse-setting register 62 of the DC motor driver control circuit 52 has brake time reverse pulse time period data set thereto beforehand by the controller 50.

First, the controller 50 delivers data D (=3) corresponding to the rotational direction data designating the normal direction and the write address A (A=FF0036h in the case of the present example) corresponding to the rotational direction specification register 61, to the DC motor driver control circuit 52.

Then, the controller 50 changes the level of a write signal WRITE to "L" level at time t1 in a timing corresponding to the system clock CLK.

This causes the DC motor driver control circuit 52 to write the data D corresponding to rotational direction data designating stoppage, in the rotational direction specification register 61.

Then, at time t2, the DC motor driver input terminal control block 76 sets the pump motor normal rotation control signal PMCF and the pump motor reverse rotation control signal PMCR at "L" level and "H" level, respectively, based on the brake time reverse pulse time period data stored in the brake time reverse pulse-setting register 62.

As a result, the signal level at the control input terminal IN1A of the DC motor driver 53 goes low, while that at the control input terminal IN2A goes high (see FIG. 11), so that the controller 85 delivers the control signal CSW to turn off the transistor Q1 and the transistor Q4 and turn on the transistor Q2 and the transistor Q3. Hence, the drive current flows through a current path of the power supply VS the drive current output terminal OUT2A the DC motor 25M the drive current output terminal OUT1A the ground GND, whereby causing the DC motor 25M to start reverse rotation.

The DC motor 25M is driven for rotation in the reverse rotation direction over a time period (reverse-pulse brake time period) corresponding to the brake time reverse pulse time period data stored in the brake time reverse pulse-setting register 62, and the supply of the drive current to the pump motor 25M is stopped at time t3.

Further, during the reverse-pulse brake time period (t2 to t3), the pump motor pulse width control signal PMPWM is maintained at "H" level, and after time t3, set to "L" level.

The DC motor operation-terminating interrupt block 77 generates the DC motor operation-terminating interrupt signal nINIT under the control of the DC motor driver input terminal control block 76 and delivers the signal to the controller 50, to thereby notify the same of completion of stop control for stopping the pump motor 25M, followed by terminating the stop control operation of the DC motor control system during the normal rotation of the DC motor.

Next, operations responsive to designation of stoppage during the reverse rotation of the DC motor 25M will be described.

FIG. 14 is a timing chart showing these operations during the reverse rotation of the DC motor.

In this case, it is assumed that the brake time reverse pulse-setting register 62 of the DC motor driver control circuit 52 has brake time reverse pulse time period data set thereto beforehand by the controller 50.

First, the controller 50 delivers data D (=3) corresponding to the rotational direction data designating the normal direction and the write address A (A=FF0036h in the case of the above example) corresponding to the rotational direction specification register 61, to the DC motor driver control circuit 52.

Then, the controller 50 changes the level of a write signal WRITE to "L" level at time tl in a timing corresponding to the system clock CLK.

This causes the DC motor driver control circuit 52 to write the data D corresponding to rotational direction data designating the stoppage, in the rotational direction specification register 61.

Then, at time t2, the DC motor driver input terminal control block 76 sets the pump motor reverse rotation control signal PMCR at "L" level and the pump motor normal rotation control signal PMCF at "H" level, respectively, based on the brake time reverse pulse time period data stored in the brake time reverse pulse-setting register 62.

As a result, the signal level at the control input terminal IN1A of the DC motor driver 53 goes high, while that at the control input terminal IN2A goes low (see FIG. 11), so that the controller 85 delivers the control signal CSW to turn off the transistor Q1 and the transistor Q4 and turn on the transistor Q2 and the transistor Q3. Hence, the drive current flows through a current path of the power supply VS the drive current output terminal OUT1A the DC motor 25M the drive current output terminal OUT2A the ground GND, thereby causing the DC motor 25M to start normal rotation.

The DC motor 25M is driven for rotation in the normal rotational direction over a time period (reverse-pulse brake time period) corresponding to the brake time reverse pulse time period data stored in the brake time reverse pulse-setting register 62, and the supply of the drive current to the pump motor 25M is stopped at time t3.

Further, during the reverse-pulse brake time period (t2 to t3), the pump motor pulse width control signal PMPWM is maintained at "H" level, and after time t3, set to "L" level.

The DC motor operation-terminating interrupt block 77 generates the DC motor operation-terminating interrupt signal nINIT under the control of the DC motor driver input terminal control block 76, and delivers the signal to the controller 50, to thereby notify the same of completion of stop control for stopping the pump motor 25M, followed by terminating the stop control operation of DC motor control system during the reverse rotation of the DC motor.

As described above, when rotational direction designation data corresponding to the stoppage instruction is written into the DC motor driver control circuit 52, it carries out stop control irrespective of the contents (=value) of the motor operation time period-measuring counter 69.

Therefore, the controller 50 can cause the DC motor driver control circuit 52 to apply reverse pulses to the DC motor 25M by itself for a predetermined time period and thereafter turn off the drive current, simply by writing a stoppage instruction or data designating stoppage into the DC motor drive control circuit 52, which makes it possible to simplify control of a CPU, a microprocessor or the like serving as the controller 50.

Further, when the DC motor 25M is not rotating, if the controller 50 writes rotational direction designation data corresponding to the stoppage instruction, the DC motor driver control circuit 52 disregards the data, and immediately delivers the DC motor operation-terminating interrupt signal nINIT to the controller 50 via the DC motor operation-terminating interrupt block 77, thereby terminating stop control processing instructed.

As described above, the present embodiment is configured such that the actual amount of rotation of a motor, that is, the actual number of rotations thereof is controlled, so that it is possible to use a DC motor in place of a stepping motor which is expensive and easily adversely affected by lowering in power supply voltage, and at the same time carry out rotation control as accurately as the stepping motor, even when it is driven by a battery which is more likely to lower in power supply voltage.

A first variation: Although in the above description, the DC motor control system is applied to a label printer using a recording medium in the form of a tape, this is not limitative, but it can be applied to an ink jet recording apparatus of a type which carries out printing on a cut sheet of an A-4 size, a B-5 size or the like.

A second variation: Further, the DC motor control system can be applied to recording apparatuses of an ink jet type, which employ various kinds of recording methods known in the art, such as a pressure control method, and a thermal control method.

A third variation: Although in the above description, a case in which the DC motor 25M is reliably operated by control operations is described, this is not limitative, but for instance, if the level of the encoder output signal ME delivered from the encoder 54 is not changed for an approximately one second after designation of the normal rotation operation or the reverse rotation operation, it may be determined that there has occurred locking of the motor.

Then, if the DC motor control system is configured such that in such an event, an error flag is set to "1", and the flag is cleared again in response to rotational direction data written by the controller, it is possible to prevent breakage or damage of component parts of the system due to an erroneous operation.

A fourth variation: Although in the above description, a case where the DC motor control system is applied to an ink jet recording apparatus is described, this is not limitative, but it can be applied to any other apparatus which requires accurate control of the amount of rotation of a motor although power supply voltage can be lowered as in a case where it is driven by a battery.

A fifth variation: Although in the above description, the DC motor is constructed such that the encoder output signal ME delivered from the encoder 54 is directly input to a latter operation stage of the DC motor driver control circuit, such as the motor speed-measuring counter 68 and the motor operation time period-measuring counter 69, this is not limitative, but to prevent the encoder output signal ME from hunting, the DC motor may be configured such that the encoder output signal ME is delivered to the latter operation stage of the DC motor driver control circuit, after sampling of the encoder output signal ME a plurality of times, only when the signal level of the encoder output signal ME obtained by the plurality of times of sampling operations are changed within a predetermined range (within a range in which the signal levels are not substantially changed).

For instance, if the DC motor is constructed such that the encoder output signal ME is delivered to the latter operation stage of the DC motor driver control circuit, on condition that there is no change in the signal when it is sampled two times at a sampling timing of 3.2 [psec] (50 [μsec]×26), hunting of the encoder output signal ME can be easily prevented.

According to the invention, it is possible to control the amount of rotation of a DC motor as accurately as a stepping motor, even when power supply voltage is lowered, and this makes it possible to construct a DC motor control system at reduced costs, which enables accurate rotation control to be performed by an apparatus which can suffer from lowering of power supply voltage, such as one driven by a battery.

It is further understood by those skilled in the art that the foregoing is a preferred embodiment of the invention, and that various changes and modifications may be made without departing from the spirit and scope thereof.

What is claimed is:

1. A DC motor control system for carrying out rotation control of a non-stepping DC motor, comprising
   detection means for detecting rotations of said non-stepping DC motor and outputting a detection signal indicative of a number of the detected rotations of said non-stepping DC motor; and
   motor stop control means which carries out stop control for stopping said non-stepping DC motor by braking rotation of said non-stepping DC motor indicated by said detection signal has reached a predetermined number.

2. A DC motor control system for carrying out rotation control of a non-stepping DC motor, comprising:
   detection means for detecting rotations of said non-stepping DC motor and outputting a pulse signal having a number of pulses corresponding in number to said number of the detected rotations,
   determination means for determining whether or not a count of said pulses of said pulse signal is equal to a reference count;
   drive current control means for controlling a drive current supplied to said non-stepping DC motor by effecting pulse width modulation control of said drive current; and
   motor stop control means which carries out stop control, via said drive current control means, for stopping said non-stepping DC motor by braking rotation of said non-stepping DC motor when said count of said pulses of said pulse signal becomes equal to said reference count.

3. A DC motor control system according to claim 2, wherein said non-stepping DC motor starts to rotate, said drive current control means maintains a pulse width at its maximum value, thereby maintaining said drive current at its maximum amount during a time period from a point in time at which said non-stepping DC motor starts to rotate to a point in time at which said count of said pulses reaches a predetermined initial count.

4. A DC motor control system according to claim 2, wherein said detection means comprises a rotary encoder, and wherein said pulse signal has one or a plurality of pulses per one rotation of said non-stepping DC motor.

5. A DC motor control system according to claim 2, including:
   rotational speed detection means for detecting a rotational speed of said non-stepping DC motor by measuring an interval from one timing of transition from one signal level to another signal level and next timing of said transition from said one signal level to said another signal level; and
   rotational speed comparison means for comparing said rotational speed of said non-stepping DC motor detected by said rotational speed detection means with a reference rotational speed, and
   wherein said drive current control means controls said drive current based on a result of the comparison.

6. A DC motor control system according to claim 5, including reference rotational speed data storage means for storing reference rotational speed data representative of said reference rotational speed.

7. A DC motor control system according to claim 6, wherein said reference rotational speed data storage means includes:
   normal rotation reference rotational speed data storage means for storing said reference rotational speed data for normal rotation of said non-stepping DC motor; and
   reverse rotation reference rotational speed data storage means for storing said reference rotational speed data for reverse rotation of said non-stepping DC motor.

8. A DC motor control system according to claim 1, wherein said motor stop control means includes:
   brake time period storage means for storing in advance a brake time period over which rotation of said non-stepping DC motor is braked; and
   drive current supply stop means for stopping supply of said drive current to said non-stepping DC motor after a lapse of said brake time period.

9. A method of controlling rotation of a non-stepping DC motor, comprising the steps of:
   detecting rotations of said non-stepping DC motor and outputting a detection signal indicative of a number of the detected rotations of said non-stepping DC motor; and
   carrying out stop control for stopping said non-stepping DC motor by braking rotation of said non-stepping DC motor when said number of the detected rotations of said non-stepping DC motor indicated by said detection signal has reached a predetermined number.

10. A method of controlling rotation of a non-stepping DC motor, comprising the steps of:

detecting rotations of said non-stepping DC motor and outputting a pulse signal having a number of pulses corresponding in number to said number of the detected rotations, determining whether or not a count of said pulses of said pulse signal is equal to a reference count;

controlling a drive current supplied to said non-stepping DC motor by effecting pulse width modulation control of said drive current; and carrying out stop control for stopping said non-stepping DC motor by braking rotation of said non-stepping DC motor when said count of said pulses of said pulse signal becomes equal to said reference count.

11. A method according to claim 10, wherein the step of controlling said drive current includes, when said non-stepping DC motor starts to rotate, maintaining a pulse width at its maximum value, thereby maintaining said drive current at its maximum amount, during a time period from a point in time at which said non-stepping DC motor starts to rotate to a point in time at which said count of said pulses reaches a predetermined initial count.

12. A method according to claim 10, wherein said non-stepping DC motor includes a rotary encoder for generating said pulse signal, and wherein said pulse signal has one or a plurality of pulses per one rotation of said non-stepping DC motor.

13. A method according to claim 10, further including the steps of:

detecting a rotational speed of said non-stepping DC motor by measuring an interval from one timing of transition from one signal level to another signal level and next timing of said transition from said one signal level to said another signal level; and comparing the detected rotational speed of said non-stepping DC motor with a reference rotational speed, and wherein the step of controlling said drive current includes controlling said drive current based on a result of the comparison.

14. A method according to claim 10, wherein the step of carrying out said stop control comprises the steps of:

storing in advance a brake time period over which rotation of said non-stepping DC motor is braked; and stopping supply of said drive current to said non-stepping DC motor after a lapse of said brake time period.

* * * * *